United States Patent
Furuki

(10) Patent No.: US 9,426,331 B2
(45) Date of Patent: Aug. 23, 2016

(54) PRINTED MATTER IDENTIFYING DEVICE AND PRINTED MATTER IDENTIFYING SYSTEM

(71) Applicant: Mitsubishi Electric Corporation, Chiyoda-ku (JP)

(72) Inventor: Ichiro Furuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/427,468

(22) PCT Filed: Aug. 28, 2013

(86) PCT No.: PCT/JP2013/073032
§ 371 (c)(1),
(2) Date: Mar. 11, 2015

(87) PCT Pub. No.: WO2014/069084
PCT Pub. Date: May 8, 2014

(65) Prior Publication Data
US 2015/0237233 A1      Aug. 20, 2015

(30) Foreign Application Priority Data
Oct. 30, 2012   (JP) .................................. 2012-239038

(51) Int. Cl.
*H04N 1/04*        (2006.01)
*H04N 1/44*        (2006.01)

(52) U.S. Cl.
CPC .................................. *H04N 1/4446* (2013.01)

(58) Field of Classification Search
CPC .................................................. H04N 1/4446
USPC ................................... 358/1.9, 474, 498, 497
See application file for complete search history.

(56) References Cited

U.S. PATENT DOCUMENTS

| | | |
|---|---|---|
| 2004/0258274 A1 | 12/2004 | Brundage et al. |
| 2009/0165934 A1 | 7/2009 | Koike |
| 2009/0303547 A1* | 12/2009 | Kurihara ............... G06F 3/1204 358/3.28 |

(Continued)

FOREIGN PATENT DOCUMENTS

| | | |
|---|---|---|
| JP | 2000 11230 | 1/2000 |
| JP | 2000 263909 | 9/2000 |

(Continued)

OTHER PUBLICATIONS

International Search Report Issued Nov. 12, 2013 in PCT/JP2013/073032 Filed Aug. 28, 2013.

*Primary Examiner* — Houshang Safaipour
(74) *Attorney, Agent, or Firm* — Oblon, McClelland, Maier & Neustadt, L.L.P

(57) ABSTRACT

A printed matter identifying device that identifies a printed matter printed by a predetermined printing apparatus and having on its surface at least two or more areas that are different in surface property to each other includes: an image reading unit that controls an external light source and camera so that reflected images displayed by the light source respectively on the areas of the surface of the printed matter are captured by the camera to acquire respective image information of the reflected images; an image processing unit that performs image-processing of the image information of the reflected images acquired by the image reading unit; and an image determination unit that uses a differential value between the image information of the reflected images obtained by the image-processing by the image processing unit, to determine whether or not the printed matter is a printed matter printed by the predetermined printing apparatus.

14 Claims, 12 Drawing Sheets

(56) References Cited

U.S. PATENT DOCUMENTS

| | | | |
|---|---|---|---|
| 2011/0002012 A1 | 1/2011 | Amagai | |
| 2011/0188102 A1 | 8/2011 | Shirakura et al. | |
| 2011/0304861 A1* | 12/2011 | Monga | H04N 1/6033 358/1.9 |

FOREIGN PATENT DOCUMENTS

| JP | 2002 331765 | 11/2002 |
|---|---|---|
| JP | 2003 244434 | 8/2003 |
| JP | 2004 50762 | 2/2004 |
| JP | 2004 74557 | 3/2004 |
| JP | 2004 234274 | 8/2004 |
| JP | 2005 41023 | 2/2005 |
| JP | 2006 261819 | 9/2006 |
| JP | 2006 524840 | 11/2006 |
| JP | 2007 88850 | 4/2007 |
| JP | 2009 154410 | 7/2009 |
| JP | 2010 268140 | 11/2010 |
| JP | 2011 158788 | 8/2011 |

* cited by examiner

FIG.8
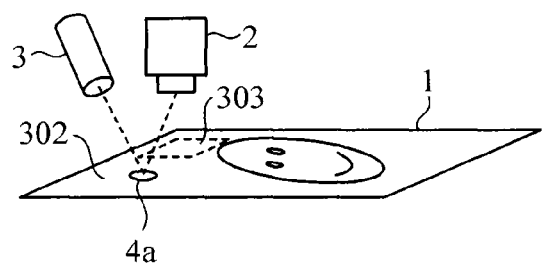
(a)
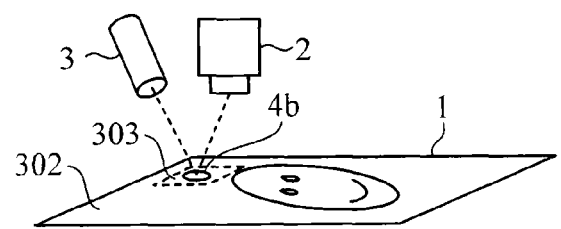
(b)
FIG.9
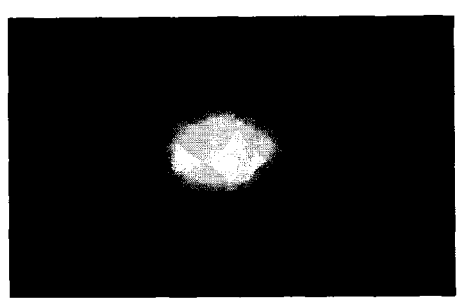 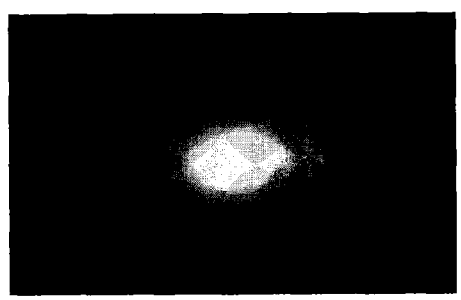
(a) (b)

FIG.15
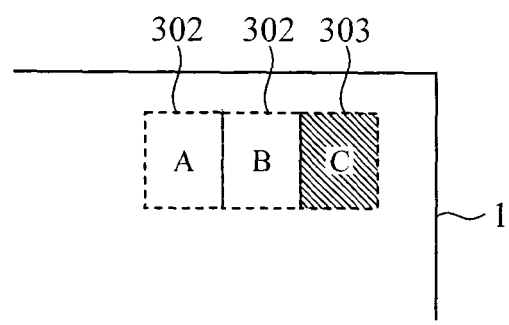
(a)
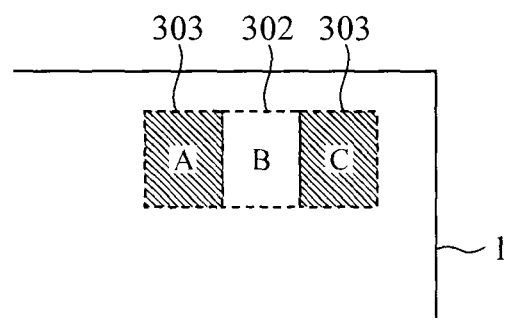
(b)

FIG.18
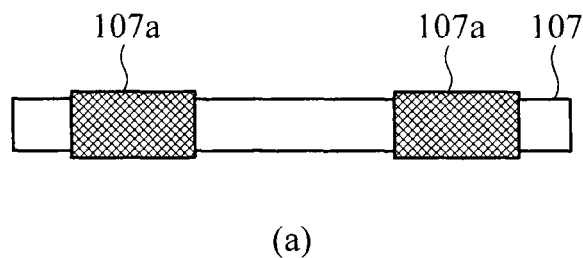
(a)
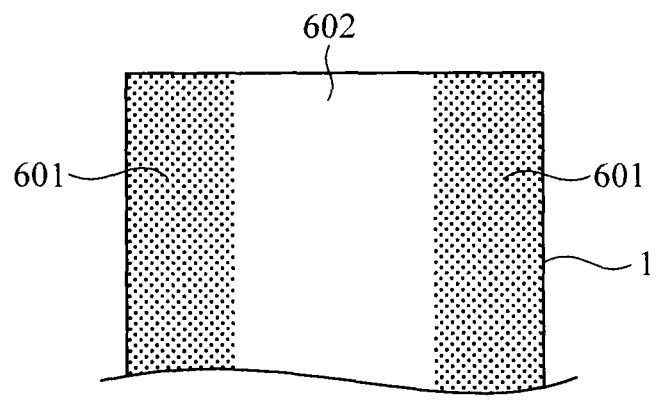
(b)
FIG.19
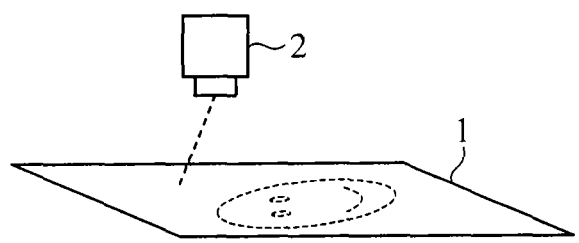

PRINTED MATTER IDENTIFYING DEVICE AND PRINTED MATTER IDENTIFYING SYSTEM

TECHNICAL FIELD

This invention relates to authenticity determination of a printed matter, and in particular, to a printed matter identifying device and a printed matter identifying system for identifying whether or not a printed matter is that printed out from a predetermined printing apparatus.

BACKGROUND ART

Conventionally, as a method for preventing a printed matter from being copied illegally by copy machines, there is a way of printing in the printed matter a pattern having a high resolution more than that by the resolving powers of the copy machines. However, in recent years, capabilities of the copy machines have been enhanced dramatically, so that the resolving powers of the copy machines are increased, and thus, by such a way, it becomes difficult to prevent a printed matter from being copied illegally.

In this respect, for example in Patent Document 1, as a method for making it unable by the copy machines to reproduce a feature of the printed matter, there is disclosed a way in which a print paper formed with a concavity-convexity forming layer that causes volume increase by heat treatment, is used so that concavities and convexities are developed on a printed image, and a copied matter is identified depending on whether the concavities and convexities with a predetermined pattern emerge or not. Further, for example in Patent Document 2, there is disclosed a method in which a hologram is provided on a printed matter and authenticity determination of the printed matter is made depending on whether or not there is a match between identification information and that from the hologram.

CITATION LIST

Patent Document

Patent Document 1: Japanese Patent Application Laid-open No. 2002-331765
Patent Document 2: Japanese Patent Application Laid-open No. 2011-158788

SUMMARY OF THE INVENTION

Problems to be Solved by the Invention

However, according to the conventional arts as in Patent Document 1 and Patent Document 2, since such a special paper or hologram has to be used, there is a problem that printing cost increases and a special device has to be used for detecting a copied printed matter.

This invention has been made to solve such a problem, and an object thereof is to provide a printed matter identifying device and a printed matter identifying system that can easily detect a copied printed matter.

Means for Solving the Problems

In order to accomplish the above object, a printed matter identifying device and a printed matter identifying system according to the invention are provided as or with a printed matter identifying device that identifies a printed matter printed by a predetermined printing apparatus and having on its surface at least two or more areas that are different in surface property to each other, characterized in that it comprises: an image reader that captures reflected images displayed by a light source respectively on the areas of the surface of the printed matter by a camera to acquire respective image information of the reflected images; an image processor that performs image-processing of the image information of the reflected images acquired by the image reader; and an image determinator that uses a differential value between the image information based on luminance values between areas having different surface properties in the reflected images obtained by the image-processing by the image processor, to determine whether or not the printed matter is a printed matter printed by the predetermined printing apparatus.

Effect of the Invention

According to the printed matter identifying device and the printed matter identifying system, it is possible, without requiring such a special paper or device and by an easy way, to identify whether a printed matter is an original print or a copied printed matter.

BRIEF DESCRIPTION OF THE DRAWINGS

FIG. 8 is a diagram for illustrating operations of acquiring image data of printed-matter surface states, by the printed matter identifying device according to Embodiment 1 of the invention.

FIG. 9 is a diagram for illustrating an image processing result about a printed-matter surface state of a printed matter 1 having a surface on which a matte finish is provided partly and a gloss finish is provided in the other area.

FIG. 15 is a diagram showing an example of transferred positions of a glossy area(s) and a matte area(s) on the printed matter according to Embodiment 3 of the invention.

FIG. 16 is a table showing a correspondence between transferred positions of a glossy area(s) and a matte area(s) on the printed matter and a kind of a printer, according to Embodiment 3 of the invention.

FIG. 18 is diagrams illustrating a configuration of a grip roller in a printer that uses a grip-roller system for feeding a recording paper and a state of a back surface of the printed matter.

FIG. 19 is a diagram illustrating an operation of acquiring image data of a printed-matter back-surface state by the printed matter identifying device according to Embodiment 4 of the invention.

MODES FOR CARRYING OUT THE INVENTION

Hereinafter, for illustrating the invention in more detail, embodiments for carrying out the invention will be described according to the accompanying drawings.
Embodiment 1

Figure 1:
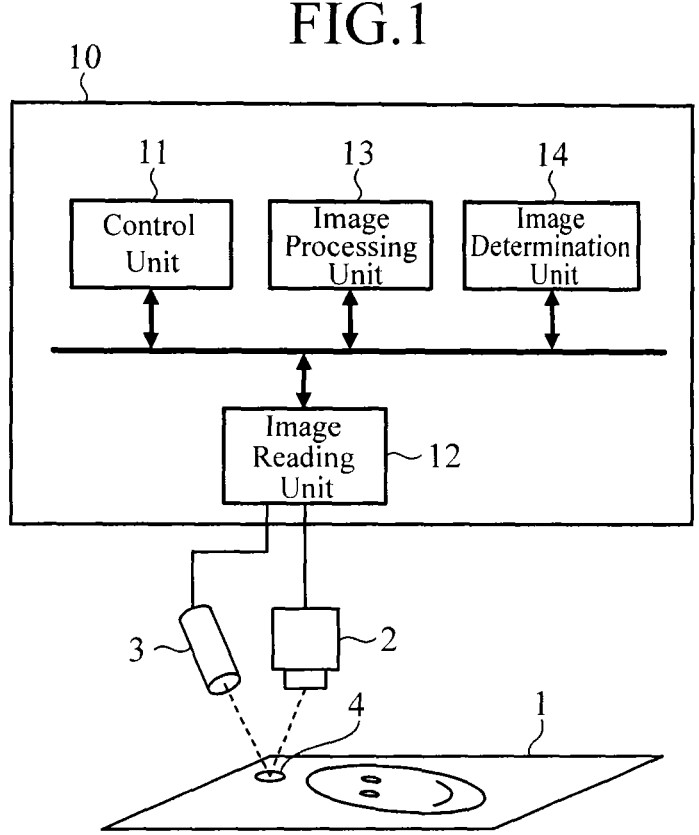
FIG. 1 includes a block diagram showing an internal configuration of a printed matter identifying device and a diagram illustrating a configuration for identifying a printed matter, according to Embodiment 1 of the invention.

FIG. 1 includes a block diagram showing an internal configuration of a printed matter identifying device 10 and a diagram illustrating a configuration for identifying a printer matter, according to Embodiment 1 of the invention.

In FIG. 1, the printed matter identifying device 10 performs identification of a printed matter 1 by reading, using a digital camera unit 2, a reflected image 4 resulting from causing a light source 3 to emit light to the printed matter 1.

The printed matter identifying device 10 includes a control unit 11, an image reading unit 12, an image processing unit 13 and an image determination unit 14.

The control unit 11 controls respective operations of the image reading unit 12, the image processing unit 13 and the image determination unit 14.

The image reading unit 12 controls operations of the digital camera unit 2 and the light source 3. The light source 3 is a point light source, such as an LED or the like, and the digital camera unit 2 captures the reflected image 4 of the light source 3 displayed on a surface of the printed matter 1. The image reading unit 12 acquires image data (image information) captured by the digital camera unit 2 and transmits it to the image processing unit 13.

The image processing unit 13 performs image-processing of the image data received from the image reading unit 12 and transmits an image-processing result to the image determination unit 14.

The image determination unit 14 determines from the image-processing result received from the image processing unit 13, whether the printed matter 1 is an original print printed by a predetermined printing apparatus or a copied printed matter printed by a printing apparatus other than the predetermined one.

Next, description will be made about printed-matter identification-determination processing performed by the printed matter identifying device 10 according to Embodiment 1.

First, how to prepare the printed matter 1 to be identified by the printed matter identifying device 10 will be described below.

Figure 2:
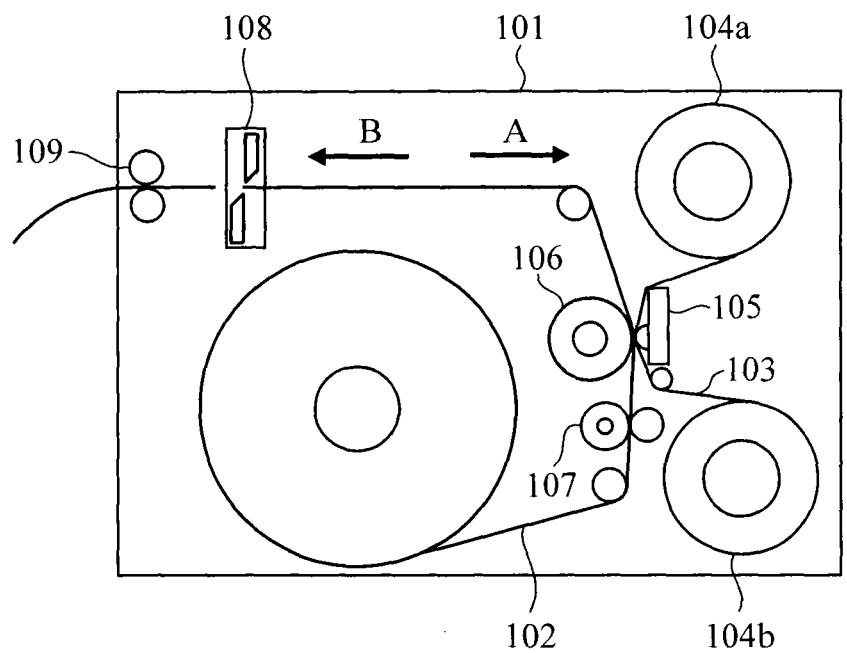
FIG. 2 is a configuration diagram showing a configuration of a thermal-transfer printer that is a printing apparatus for printing a printed matter given as an object to be identified by the printed matter identifying device according to Embodiment 1 of the invention.

FIG. 2 is a configuration diagram showing a configuration of a thermal-transfer printer that is a printing apparatus for preparing the printed matter 1 given as an object to be identified by the printed matter identifying device 10.

In FIG. 2, a printer 101 that is the thermal-transfer printer includes a recording paper 102 wound in a roll shape, and a mechanical section of the printer 101 is configured with: an ink sheet 103 for printing three-color image of yellow (Y), magenta (M) and cyan (C); an ink-sheet supplying reel 104a and an ink-sheet winding reel 104b; a thermal head 105 and a platen roller 106 for making record with the ink sheet 103; a grip roller 107 for feeding the recording paper 102; a recording-paper cutting mechanism 108 for cutting the recording paper 102; and a paper discharging roller 109.

The thermal head 105 includes a plurality of heat-generating elements in a main scanning direction and is configured so that it can be compressed to or retracted from the platen roller 106 by a thermal-head driving unit 150 (see FIG. 3) to be described later. The grip roller 107 feeds the recording paper 102 at a constant speed. The recording-paper cutting mechanism 108 cuts the recording paper 102 after completion of printing, and the paper discharging roller 109 discharges the cut recording paper 102 to the outside of the printer 101.

Figure 3:
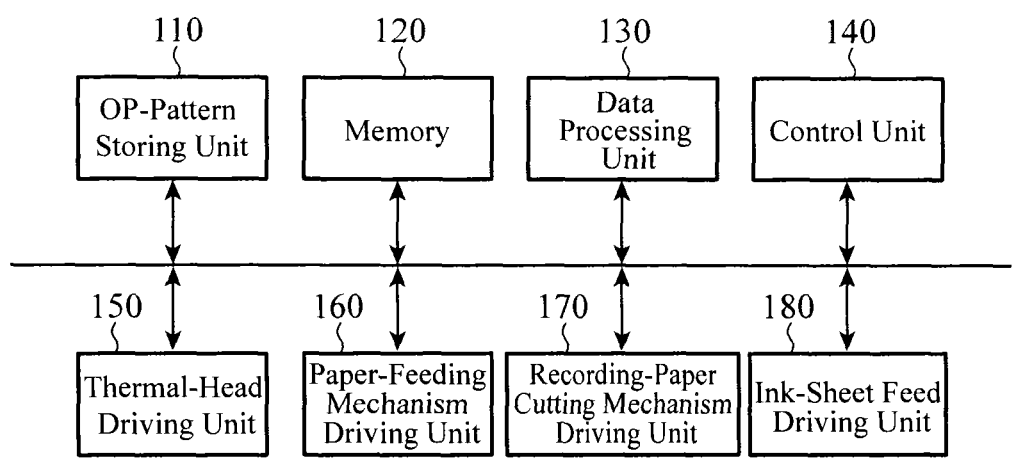
FIG. 3 is a block diagram showing a system configuration of the thermal-transfer printer given as a printing apparatus.

FIG. 3 is a block diagram showing a system configuration of the thermal-transfer printer given as a printing apparatus.

In FIG. 3, the printer 101 includes an OP (over print)-pattern storing unit 110, a memory 120, a data processing unit 130, a control unit 140, the thermal-head driving unit 150, a paper-feeding mechanism driving unit 160, a recording-paper cutting mechanism driving unit 170 and an ink-sheet feed driving unit 180.

The OP-pattern storing unit 110 is provided for storing a transfer pattern of an OP (OP pattern) of the printer 101, and a surface property of the printed matter 1 printed by the printer 101 is determined depending on the OP pattern stored in the OP-pattern storing unit 110.

The memory 120 is a storage unit that stores image data transmitted from an unshown image-data input device such as a PC. The data processing unit 130 reads the image data stored in the memory 120 and converts it into printing data for the printer. The thermal-head driving unit 150 drives the thermal head 105 on the basis of the printing data for the printer outputted from the data processing unit 130. The paper-feeding mechanism driving unit 160 drives the grip roller 107 and the paper discharging roller 109 in order to make feeding operation of the recording paper 102. The recording-paper cutting mechanism driving unit 170 drives the recording-paper cutting mechanism 108. The ink-sheet feed driving unit 180 drives the ink-sheet supplying reel 104a and the ink-sheet winding reel 104b to thereby make feeding operation of the ink sheet 103.

The control unit 140 controls operations of the respective components of the OP-pattern storing unit 110, the memory 120, the data processing unit 130, the thermal-head driving unit 150, the paper-feeding mechanism driving unit 160, the recording-paper cutting mechanism driving unit 170 and the ink-sheet feed driving unit 180.

Figure 4:
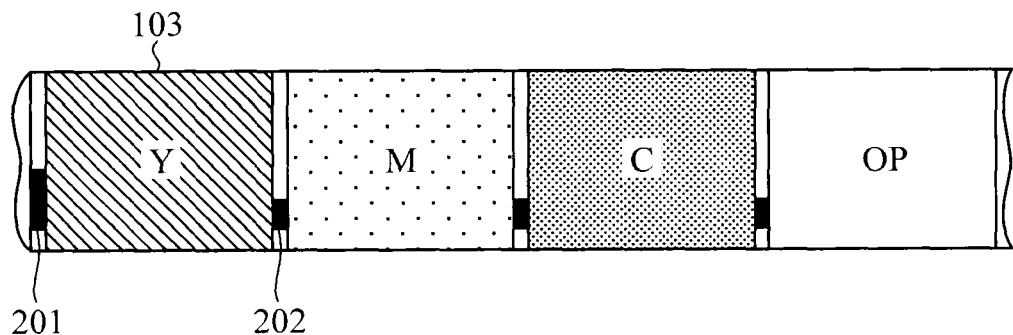
FIG. 4 is a plan view of an ink sheet used in the thermal-transfer printer given as the printing apparatus.

FIG. 4 is a plan view of the ink sheet 103 used in the thermal-transfer printer given as a printing apparatus.

As shown in FIG. 4, in the ink sheet 103, there are successively arranged ink areas of three colors (Y, M, C) and an over coat area (OP). In FIG. 4, indicated at Y shows the ink area of yellow color, at M shows the ink area of magenta color, at C shows the ink area of cyan color, and at OP shows the over coat area, and a single sheet of printed image is formed using these Y, M, C and OP as one set. A marker 201 is a Y-color head position marker for detecting Y-color ink placed at the leading position in the one set of these Y, M, C and OP, and markers 202 are head position markers for detecting the other color inks.

Next, a printing operation of the printer 101 will be described.

First of all, the thermal head 105 is being compressed by the thermal-head driving unit 150 to the platen roller 106 so that the ink sheet 103 and the recording paper 102 are brought in close contact with each other. In this condition, upon detecting the Y-color head position marker 201 of the ink sheet 103 using an unshown detection device, the thermal head 105 is placed by the thermal-head driving unit 150 so that the marker is matched to a printing start position of the Y color (a position of the heat-generating-element line of the thermal head 105).

Upon receiving the image data from an unshown image-data input device such as a PC, the memory 120 stores the input image data thus received.

Then, the data processing unit 130 reads the input image data stored in the memory 120, converts it into printing data and transmits this data to the thermal-head driving unit 150.

Then, the control unit 140 controls the thermal-head driving unit 150, the paper-feeding mechanism driving unit 160, the recording-paper cutting mechanism driving unit 170 and the ink-sheet feed driving unit 180, to thereby perform a printing operation. Specific description will be made as follows.

When the printing operation is started, the grip roller 107 is caused by the paper-feeding mechanism driving unit 160 to start feeding of the recording paper 102 in a printing direction (A-direction in FIG. 2). At the same time, the thermal head 105 is caused by the thermal-head driving unit 150 to start Y-color printing onto the recording paper 102. Specifically, the thermal head 105 is driven by the thermal-head driving unit 150 on the basis of the printing data outputted from the data processing unit 130, so that the thermal head 105 makes printing on the recording paper 102 with the ink of the ink sheet 103 on a line-by-line basis.

Further, the ink-sheet winding reel 104b is caused by the ink-sheet feed driving unit 180 to wind the ink sheet 103 undergone the printing.

After completion of the Y-color printing, the thermal head 105 is retracted out by the thermal-head driving unit 150, and the grip roller 107 is caused by the paper-feeding mechanism driving unit 160 to feed the recording paper 102 toward in a paper-discharging direction (B-direction in FIG. 2) up to the printing start position. Further, upon detecting the M-color head position marker 202 using an unshown detection device, the ink-sheet winding reel 104b is caused by the ink-sheet feed driving unit 180 to wind the ink sheet 103 after completion of Y-printing until the M-color head position is matched to the printing start position.

Thereafter, similarly to the Y-color printing operation, the thermal head 105 is compressed to the platen roller 106 by the thermal-head driving unit 150, and the grip roller 107 is caused by the paper-feeding mechanism driving unit 160 to start feeding of the recording paper 102 in the printing direction (A-direction in FIG. 2), so that the thermal head 105 starts M-printing. After completion of the M-color printing, an operation similar to that after completion of the Y-color printing is performed, so that the grip roller 107 is caused by the paper-feeding mechanism driving unit 160 to feed the recording paper 102 up to the printing start position, and by the thermal-head driving unit 150, the thermal head 105 performs C-color printing using an operation similar to that in the Y-color printing and the M-color printing.

After completion of the C-color printing, the data processing unit 130 converts the OP-pattern data stored in the OP-pattern storing unit 110 into printing data for the printer. By the thermal-head driving unit 150, the thermal head 105 transfers the OP onto the recording paper 102 on which Y-color, M-color and C-color are printed, on the basis of the OP-pattern data converted into the printing data for the printer by the data processing unit 130.

After completion of the OP transferring, the thermal head 105 is retracted out by the thermal-head driving unit 150, and the grip roller 107 is caused by the paper-feeding mechanism driving unit 160 to feed the recording paper 102 in the paper-discharging direction (B-direction in FIG. 2). When the print leading position of the recording paper 102 reaches the recording-paper cutting mechanism 108 on the feed path, the driving of the grip roller 107 is stopped by the paper-feeding mechanism driving unit 160, the recording-paper cutting mechanism 108 is caused by the recording-paper cutting mechanism driving unit 170 to cut the recording paper 102 in the main scanning direction, and the paper discharging roller 109 is caused by the paper-feeding mechanism driving unit 160 to discharge the recording paper 102 to the outside of the printer 101.

Here, the OP transferring will be described.

An OP is transferred, when uniform transfer energy is applied thereto from the thermal head 105, with a uniform film-thickness onto the recording paper 102, thereby making it possible to protect the printed surface, as well as to enhance surface smoothness of the recording paper 102 so as to form a surface with a glossy appearance (glossy face).

Further, by giving an intensity variation in transfer energy, an appearance of unevenness (matte face) can be intentionally exhibited on the printed surface. The principal of how the appearance of unevenness is exhibited is different depending on a kind (structure) of an OP-ink.

In the case of a multi-layer structure ink by which an amount of the ink to be transferred can be controlled according to the intensity of the transfer energy, it is possible to exhibit an appearance of unevenness (matte face) on the printed surface by varying the film-thickness on a pixel-by-pixel basis. Specifically, the higher the transfer energy, the thicker the film-thickness becomes, and the lower the transfer energy, the thinner the film-thickness becomes. Meanwhile, in the case of a single-layer structure ink by which all of the OP-ink is transferred when the transfer energy of a specified value or more is applied thereto, it is possible to form a matte face by applying intensive transfer energy to specific pixels to thereby partially scorch the printed surface.

Figure 5:
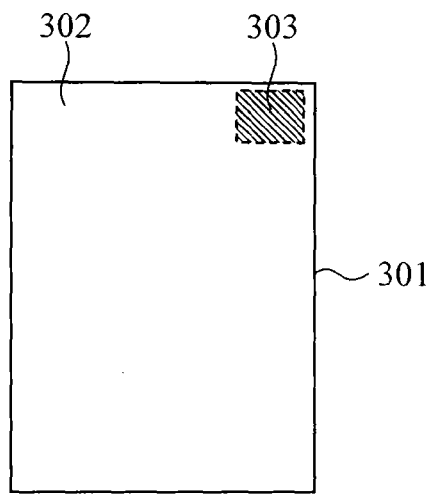
FIG. 5 is a diagram for illustrating OP-pattern data of the thermal-transfer printer in Embodiment 1 of the invention.

FIG. 5 is a diagram for illustrating OP-pattern data of the printer 101 in Embodiment 1 of the invention.

In Embodiment 1, by controlling the OP-transfer energy, both a glossy face and a matte face are formed on a single printed surface.

An OP-pattern 301 shows a whole of an OP-pattern.

A glossy area 302 shows an area where OP-transferred surface is highly glossy. A matte area 303 shows an area where OP-transferred surface is frosted (matte). In the glossy area 302, a glossy appearance is exhibited by applying uniform transfer energy, and in the matte area 303, a matte appearance is exhibited by applying transfer energy while varying its intensity.

Figure 6:
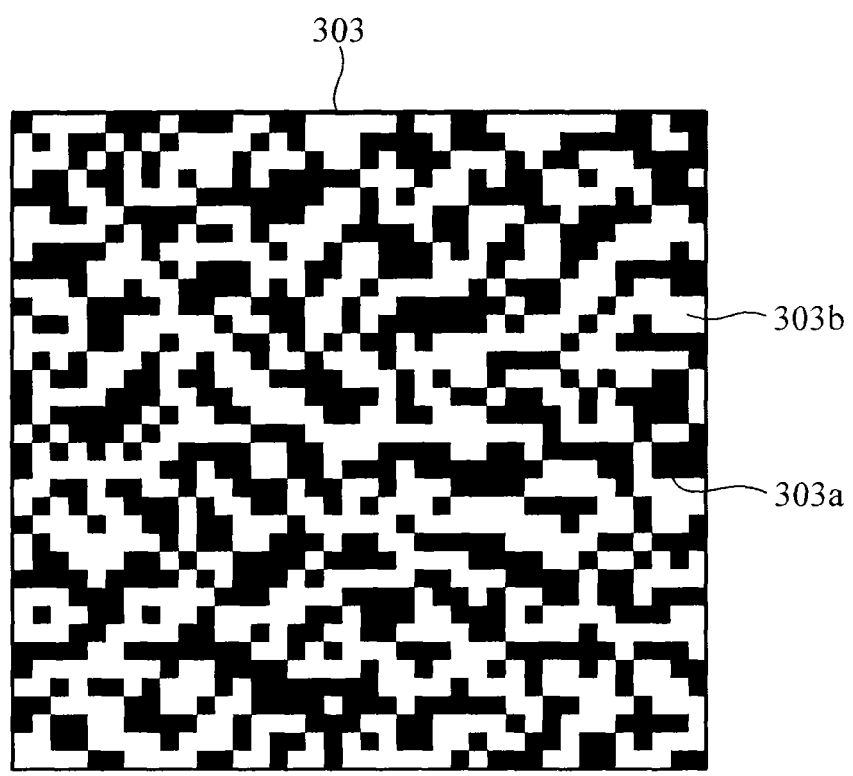
FIG. 6 is an enlarged view of a portion of a matte area in the OP-pattern data of the thermal-transfer printer in Embodiment 1 of the invention.

FIG. 6 is an enlarged view of the portion of the matte area 303 in the OP-pattern data of the printer 101 in Embodiment 1 of the invention.

In FIG. 6, to a high density portion indicated by a high density pattern 303a, strong transfer energy is applied, and to a low density portion indicated by a low density pattern 303b, weak transfer energy is applied.

With the high density pattern 303a, an OP is transferred by the transfer energy that is larger than the energy applied at the time of transferring an OP onto the glossy area 302.

In a manner described above, in the surface of the printed matter 1 with the OP pattern 301 transferred thereon, there are formed two different surface-finish areas of the glossy area 302 and the matte area 303.

In such a manner, a matte finish is provided on the matte area 303 that is a partial surface of the printed matter 1, and a gloss finish is provided on the glossy area 302 that is the other area. When the printed matter 1 is read by a scanner such as a composite machine or the like, it is difficult to read the matte appearance (appearance of unevenness) of the matte area 303. Even if the matte appearance can be detected as digital data, it is difficult to reproduce the matte appearance by a general printer. In particular, according to ink-jet printers generally popularized in homes or electrophotographic printers placed in convenience stores, it is almost impossible to form a printed surface on which a glossy area and a matte area are coexisting within a single printed surface. Thus, it is not easy to duplicate the printed matter having such a surface as shown here on which the glossy area and the matte area are coexisting.

Accordingly, when the printed matter 1 is duplicated by the ink-jet printer or the electrophotographic printer, this produces a printed matter 1 in which its glossy area 302 and matte area 303 are provided with the same surface-finish. Thus, by identifying surface-finish states of the glossy area 302 and the matte area 303, it is possible to identify whether a printed matter is a copied matter or not.

Next, with respect to the printed matter 1 printed by the printer 101, a printed matter identifying operation in the printed matter identifying device 10 will be described specifically using a flowchart.

Figure 7:
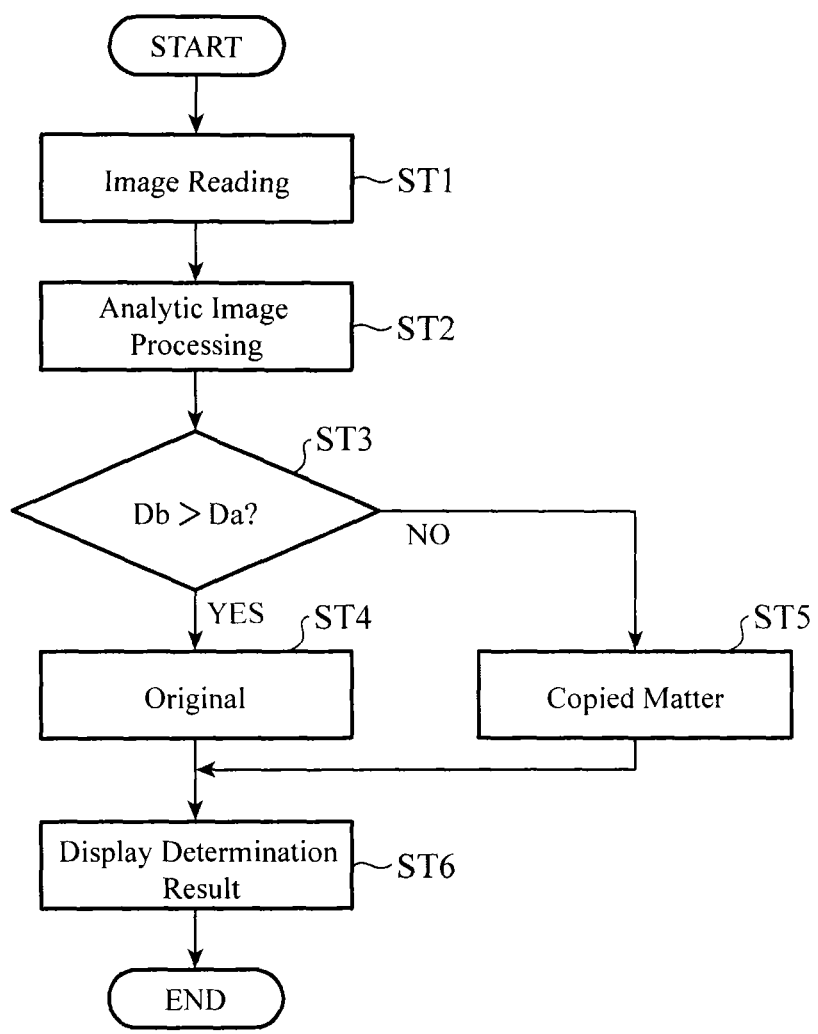
FIG. 7 is a flowchart illustrating steps of printed matter identifying processing by the printed matter identifying device according to Embodiment 1 of the invention.

FIG. 7 is the flowchart illustrating steps of printed matter identifying processing by the printed matter identifying device 10 according to Embodiment 1 of the invention.

First, the image reading unit 12 acquires as image data, surface states of the glossy area 302 and the matte area 303 of the surface of the printed matter 1 (Step ST1).

Processing in Step ST1 will be described specifically using FIG. 8.

FIG. 8 is a diagram for illustrating operations of acquiring image data of the printed-matter surface states, by the printed matter identifying device 10 according to Embodiment 1 of the invention.

As shown in FIG. 8(a), (b), the printed matter identifying device 10 causes the light source 3 to emit light to the surface of the printed matter 1 printed by the printer 101 to thereby form reflected images 4a, 4b of the light source 3, respectively on the glossy area 302 and the matte area 303 of the surface of the printed matter 1, and the respective reflected images are captured by the digital camera unit 2.

Then, the image data acquired in Step ST1 are transmitted to the image processing unit 13, and upon receiving the image data acquired in Step ST1, the image processing unit 13 performs analytic image processing and transmits a result of the image processing to the image determination unit 14 (Step ST2).

Here, with respect to the printed matter 1 in which, by the printer 101, a matte finish is provided on the matte area 303 that is a partial surface of the printed matter 1 and a gloss finish is provided on the glossy area 302 that is the other area, examples of the result of performing the image processing as described above are shown in FIG. 9 and FIG. 10.

FIG. 9 is a diagram for illustrating the image processing result about a printed-matter surface state of the printed matter 1 having a surface on which a matte finish is provided partly and a gloss finish is provided in the other area.

Figure 10:
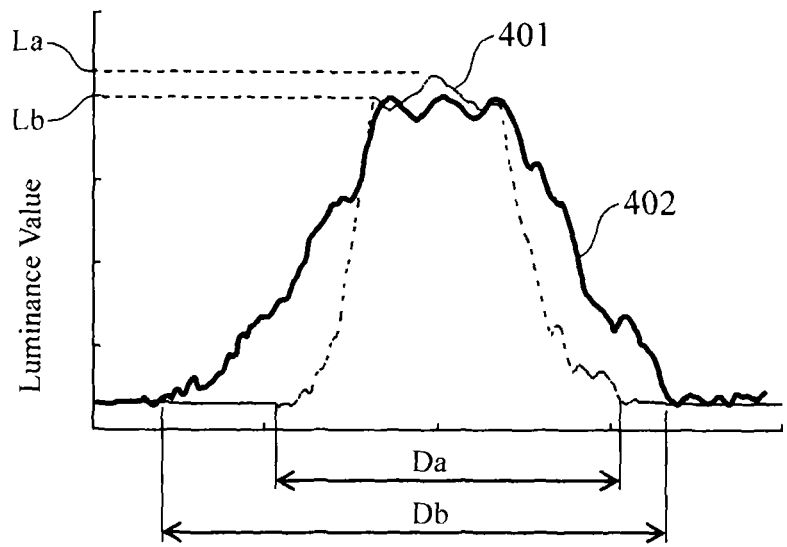
FIG. 10 is a graph showing luminance distributions in the image processing result about a printed-matter surface state of the printed matter 1 having a surface on which a matte finish is provided partly and a gloss finish is provided in the other area.

FIG. 10 is a graph showing luminance distributions with respect to the image processing result about the printed-matter surface state of the printed matter 1 having the surface on which a matte finish is provided partly and a gloss finish is provided in the other area.

FIG. 9(a), (b) respectively show examples when the image processing has been performed for the images captured by the digital camera unit 2 from the reflected images 4a, 4b. FIG. 9(a) is the diagram when the image processing has been performed for the reflected image 4a of the light source 3 on the glossy area 302 of the surface of the printed matter 1, and FIG. 9(b) is the diagram when the image processing has been performed for the reflected image 4b of the light source 3 on the matte area 303 of the surface of the printed matter 1.

Meanwhile, FIG. 10 is the graph that shows luminance distributions in an X-axis direction with respect to the image processing result shown in FIG. 9(a), (b), in which the ordinate represents a luminance value obtained from the image processing result. In FIG. 10, indicated by 401 is a luminance distribution of the reflected image 4a in the glossy area 302, and indicated by 402 is a luminance distribution state of the reflected image 4b in the matte area 303. Further, La shows a maximum luminance value of the glossy area 302, and Lb shows a maximum luminance value of the matte area 303.

In the surface of the printed matter 1 on which the reflected images 4a, 4b are formed, if the glossy area 302 and the matte area 303 have the same surface property, the luminance distribution 401 and the luminance distribution 402 would become the same in the graph; however, in the case where a matte finish is provided on a partial surface of the printed matter 1 and a gloss finish is provided on the other area using the above-described printing apparatus, because the glossy area 302 and the matte area 303 are different in surface property, the luminance distribution 401 and the luminance distribution 402 become different in the graph.

In FIG. 10, a relationship between a width Da from the rising edge to the trailing edge of the luminance distribution 401 in the glossy area 302 and a width Db from the rising edge to the trailing edge of the luminance distribution 402 in the matte area 303, is given as Db>Da. This shows that in the matte area 303, reflected light is scattered, so that the edge of the reflected image is blurred. Accordingly, by analyzing the luminance distribution states of the reflected images 4a, 4b displayed on the surface in the glossy area 302 and the surface in the matte area 303, it becomes possible to detect a difference between the surface-finish states.

Description will return to the steps of printed matter identifying processing by the printed matter identifying device 10.

Upon receiving the result of the image processing performed by the image processing unit 13 in Step ST2, the image determination unit 14 compares Da and Db in the received image processing result (Step ST3).

In Step ST3, in the case of Db>Da (in the case of "YES" in Step ST3), there is determined to be an original print printed by a predetermined printing apparatus, namely, to be the printed matter 1 in which, by the printer 101, a matte finish has been provided on the matte area 303 that is a part of the surface and a glossy finish has been provided on the glossy area 302 that is the other area (Step ST4). In contrast, in the case of other than Db>Da (in the case of "NO" in Step ST3), for example, in the case of Da Db, there is determined to be a copied printed matter printed by a printing apparatus other than the predetermined one, namely, not to be the printed matter 1 in which, by the printer 101, a matte finish has been provided on the matte area 303 that is a part of the surface and a glossy finish has been provided on the glossy area 302 that is the other area (Step ST5).

Here is noted that, in cases where there is determined to be a copied printed matter in Step ST5, Da usually never becomes extremely larger than Db. In most of the cases, there is provided a condition with no significant difference between the surface-finish states of the glossy area 302 and the matte area 303, that is, Da≈Db.

After the image processing result is subjected to the determination in Step ST3 to Step ST5, the determination result is notified to a user (Step ST6) using an unshown display device such as a display, etc., to thereby terminate the steps of printed matter identifying processing.

Note that, here, the determination whether to be an original print or a copied printed matter is performed by comparison of Da and Db; however, it is allowable to have stored in the image determination unit 14, a threshold value Shd for determining a difference between Da and Db, and to use a condition of Db−Da>Shd for determining the original print.

Further, such a surface-finish difference can also be detected from a relationship between the maximum luminance value La of the glossy area 302 and the maximum luminance vale Lb of the matte area 303 shown in FIG. 10. In the printed document 1 in which, by the printer 101, a matte finish has been provided on the matte area 303 that is a part of the surface of the printed document 1 and a glossy finish has been provided on the glossy area 302 that is the other area, the relationship between the maximum luminance value La and the maximum luminance value Lb is given as La>Lb. This is because, in the matte area 303, reflected light is scattered, so that the maximum luminance value is reduced.

Accordingly, comparing the maximum luminance value La and the maximum luminance value Lb, the image determination unit 14 can determine that it is an original print in the case of La>Lb, and determine that it is a copied printed matter in the case of La≈Lb, that is, in the case where there is no significant difference between the surface-finish states of the glossy area 302 and the matte area 303.

Note that, at this time, it is allowable, by having stored in the image determination unit 14 a threshold value Shl for determining a difference between the maximum luminance values La and Lb, to use a condition of La−Lb>Shl for determining the original print. However, it is conceivable that the difference between La and Lb emerges not so significantly depending on the surface-finish state of the glossy area 302, and that the maximum luminance value largely varies due to a flaw developed on the surface. Thus, an accuracy of determination becomes higher in the case of instead determining by comparison of blurred degrees of edges of the reflected images 4a, 4b, that is, by the width Da from the rising edge to the trailing edge of the luminance distribution 401 in the glossy area 302 and the width Db from the rising edge to the trailing edge of the luminance distribution 402 in the matte area 303.

Here, with respect to the comparison of the respective luminance data, such as the maximum luminance values La, Lb and the luminance distributions 401, 402 of the reflected images 4a, 4b on the surfaces of the glossy area 302 and the matte area 303, it is also conceivable to have caused the image determination unit 14 to store determination reference values for the luminance data, to thereby compare the luminance analysis results of the reflected images 4a, 4b as absolute values with the determination reference values, respectively.

However, a printed surface state largely varies for every printing time (for example, between a first sheet and a second sheet, etc.). Thus, when the luminance data of the reflected image 4a or 4b is compared as absolute value, there is a possibility that the accuracy of determination is lowered.

Accordingly, the luminance values or the luminance distributions of the reflected images 4a, 4b on the surfaces of the glossy area 302 and the matte area 303, are relatively compared with each other, so that the problem due to a variation of the printed surface state can be eliminated, thus making it possible to enhance the accuracy of determination. In particular, in order to stabilize the accuracy of determination, it is desirable to relatively compare with each other respective luminance data of portions of the reflected images 4a, 4b where the glossy area 302 and the matte area 303 are adjacent to each other.

Figure 11:
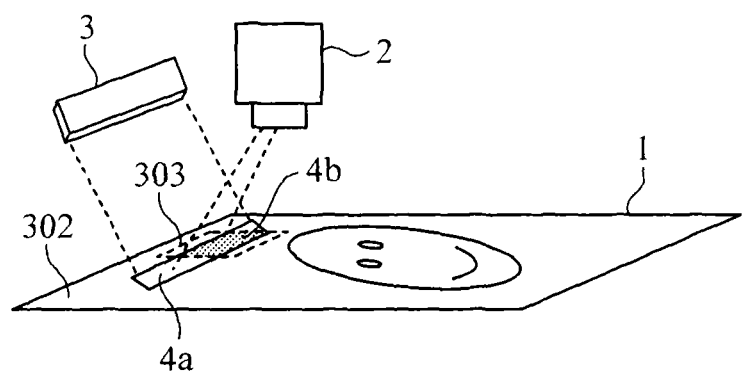
FIG. 11 is a diagram illustrating a configuration in which a line light source is used as a light source of the printed matter identifying device according to Embodiment 1 of the invention.

FIG. 11 is a diagram illustrating a configuration in which a line light source is used as the light source 3 of the printed matter identifying device 10 according to Embodiment 1 of the invention.

Note that, since an internal configuration of this printed matter identifying device 10 is similar to the configuration of Embodiment 1, its illustration and description will be omitted, and duplicated description will be omitted for the component similar to that illustrated in FIG. 1.

The difference between FIG. 11 and FIG. 1 resides in that the point light source is used in FIG. 1 as the light source 3 that is a device for forming the reflected images 4a, 4b, whereas a light source 3 in a line shape is used in FIG. 11.

As shown in FIG. 11, because the light source 3 in a line shape is used, it becomes possible to capture the reflected image 4a in the glossy area 302 and the reflected image 4b in the matte area 303 by one capturing operation of the digital camera unit 2, so that its capturing operation can be simplified.

Note that the device for forming the reflected images 4a, 4b is not limited to the light source 3 so far as it is a device by which reflected images 4a, 4b of an arbitrary object are displayed on the surface of the printed matter 1.

Meanwhile, in Embodiment 1, whether the printed matter 1 is an original print printed by the predetermined printing apparatus or a copied printed matter printed by a printing apparatus other than the predetermined one, is determined based on the luminance data acquired from the image data of the reflected images 4a, 4b displayed on the glossy area 302 and the matte area 303 formed in the surface of the printed matter 1; however, areas to be formed in the surface of the printed matter 1 are not limited to a glossy area and a matte area. For example, on a portion for the matte area, a metallic area printed with a metallic ink or a hologram printed area may be formed. In the area printed with a metallic ink, because of reflection by a brilliant material in the metallic, there is shown a reflection property different to that in a general glossy area, so that it becomes possible to identify the glossy area and the metallic area. On the surface of the hologram printed portion, there is formed an unevenness corresponding to interference stripes of the hologram, so that in the hologram printed portion, there is displayed a reflected image different to that in a general glossy portion. Thus, it is possible to identify the glossy area and the hologram printed area in the printed matter identifying system according to the invention.

Further, in the printed matter identifying device 10 according to Embodiment 1, it is allowable to use a camera for reading a two-dimensional code as the digital camera unit 2 controlled by the image reading unit 12. With respect to the printed matter 1 on which a two-dimensional code is printed, when the glossy area 302 and the matte area 303 are provided near a printed portion of the two-dimensional code, it becomes possible by the two-dimensional code reading camera to acquire image data of the reflected images 4a, 4b displayed on the glossy area 302 and the matte area 303. Thus, the two-dimensional code reading camera can be used also as a camera for identifying printed matter, so that the printed matter identifying system can be configured with low cost.

Figure 12:
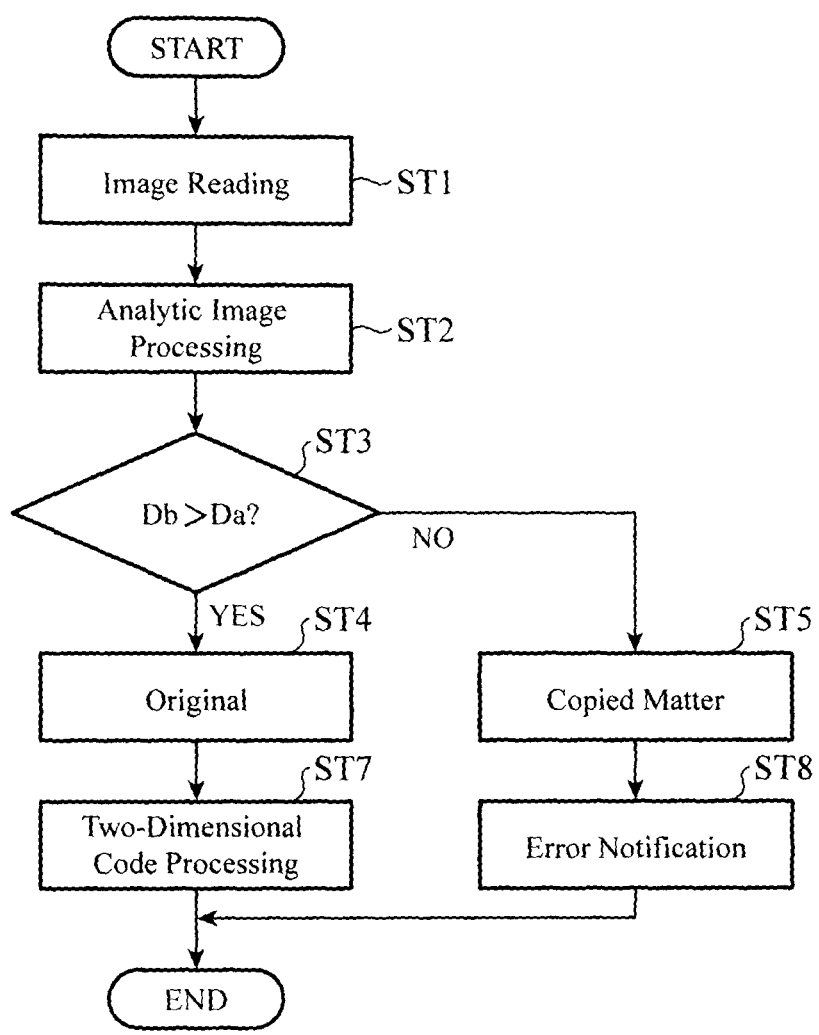
FIG. 12 is a flowchart illustrating an identifying operation for a printed matter with a two-dimensional code in the printed matter identifying system according to Embodiment 1 of the invention.

FIG. 12 is a flowchart illustrating an identifying operation for the printed matter with a two-dimensional code, in the printed matter identifying device 10 according to Embodiment 1 of the invention.

Since the processing from Step ST1 up to Step ST5 in FIG. 12 is the same as the processing from Step ST1 up to Step ST 5 in FIG. 7, its description is omitted here.

However, it is assumed that the printed matter 1 has a two-dimensional code printed thereon and the image data acquired by the image reading unit 12 is that captured by a camera for reading a two-dimensional code (or a one-dimensional code), etc.

When the printed matter 1 is determined to be an original print printed by the predetermined printing apparatus in Step ST4, the two-dimensional code is read and there is made a control to execute subsequent processing on the basis of the two-dimensional code reading result (Step ST7), to thereby terminate the steps of printed matter identifying processing. In contrast, when the printed mater 1 is determined to be a copied printed matter printed by other than the predetermined printing apparatus in Step ST5, an error notification is given to the user and there is made a control so that no subsequent processing is performed (Step ST8), to thereby terminate the steps of printed matter identifying processing. By thus controlling, it becomes possible, for example in the amusement field, to prevent the usage of a copy card in a card game in which a card with an image of a character, etc. and a two-dimensional code printed thereon is to be used.

As described above, according to the printed matter identifying device 10 according to Embodiment 1, it is so configured for the printed matter 1 to be determined when there is recognized a difference of a predetermined value or more between the luminance data of the glossy area 302 and the luminance data of the matte area 303, that it is an original print printed by a predetermined printing apparatus that forms the glossy area 302 and the matte area 303 on a printed surface; and to be determined when there is no significant difference, that it is a copied printed matter printed by other than the predetermined printing apparatus. Thus, it is possible by an easy way to identify whether the printed matter 1 is an original print or a copied printed matter.

Embodiment 2

In Embodiment 1, whether the printed matter 1 is an original print printed by a predetermined printing apparatus or a copied printed matter printed by a printing apparatus other than the predetermined one, is determined based on the luminance data acquired from the image data of the reflected images 4a, 4b displayed on the glossy area 302 and the matte area 303.

In Embodiment 2, whether the printed matter is an original print printed by a predetermined printing apparatus or a copied printed matter printed by a printing apparatus other than the predetermined one, is determined from glossiness of the glossy area 302 and the matte area 303.

Figure 13:
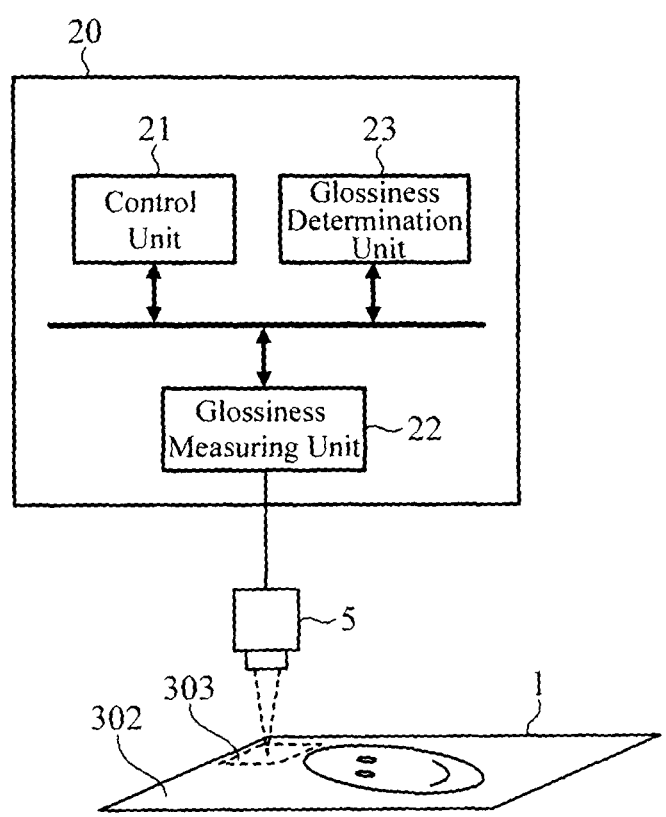
FIG. 13 is a block diagram showing a configuration of a printed matter identifying device according to Embodiment 2 of the invention.

FIG. 13 is a block diagram showing a configuration of a printed matter identifying device 20 according to Embodiment 2 of the invention.

In FIG. 13, the printed matter identifying device 20 performs identification of the printed matter 1 by reading image glossiness of the printed matter 1 from a gloss meter 5.

The printed matter identifying device 20 includes a control unit 21, a glossiness measuring unit 22 and a glossiness determination unit 23. The control unit 21 controls respective operations of the glossiness measuring unit 22 and the glossiness determination unit 23. The glossiness measuring unit 22 controls the operation the gloss meter 5.

The glossiness measuring unit 22 measures using the gloss meter 5 the image glossiness of a surface area of the printed matter 1, and transmits the measured result to the glossiness determination unit 23. The glossiness determination unit 23 performs determination of whether the printed matter 1 is an original print or a copied printed matter on the basis of the image glossiness received from the glossiness measuring unit 22.

Next, printed matter identifying processing in Embodiment 2 will be described using a flowchart. Since how to prepare the printed matter 1 is the same as in Embodiment 1, its description is omitted here.

Figure 14:
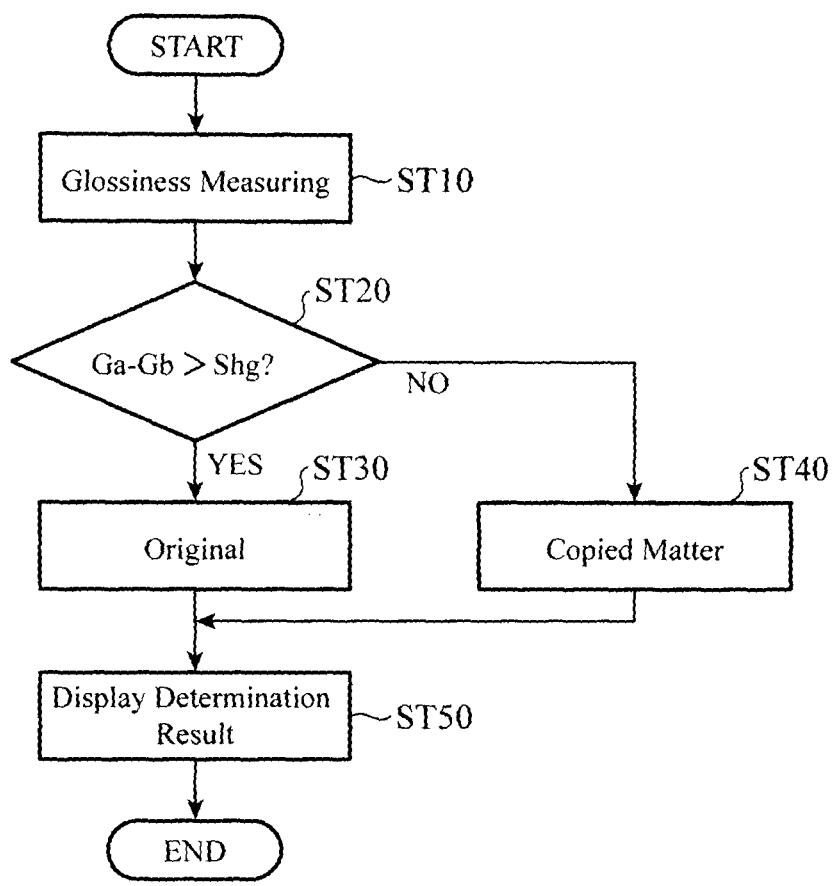
FIG. 14 is a flowchart illustrating steps of printed matter identifying processing by the printed matter identifying device according to Embodiment 2 of the invention.

FIG. 14 is the flowchart illustrating steps of printed matter identifying processing by the printed matter identifying device 20 according to Embodiment 2 of the invention.

First, the glossiness measuring unit 22 measures using the gloss meter 5, glossiness Ga of the glossy area 302 and glossiness Gb of the matte area 303 in the surface of the printed matter 1 (Step ST10). Then, the glossiness determination unit 23 acquires the glossiness Ga, Gb from the glossiness measuring unit 22, and performs determination about the glossiness using the acquired glossiness Ga, Gb (Step ST20).

Specifically, in the glossiness determination unit 23, a threshold value Shg for determining a difference between Ga and Gb is stored, so that the difference between the glossiness Ga and Gb is compared with the threshold value Shg.

Here, in the case of:

$$Ga-Gb>Shg$$

(in the case of "YES" in Step ST20), there is determined to be an original print printed by a predetermined printing apparatus, namely, to be the printed matter 1 in which, by the printer 101, a matte finish has been provided on the matte area 303 that is a part of the surface and a glossy finish has been provided on the glossy area 302 that is the other area (Step ST30). In the other case (in the case of "NO" in Step ST20), there is determined to be a copied printed matter printed by a printing apparatus other than the predetermined one, namely, not to be the printed matter 1 in which, by the printer 101, a matte finish has been provided on the matte area 303 that is a part of the surface and a glossy finish has been provided on the glossy area 302 that is the other area (Step ST40). That is, what case to be determined as a copied printed matter is the case where there is no significant difference between the surface-finish states of the area 302 and the area 303, namely, the case of $Ga \approx Gb$.

As described above, according to the printed matter identifying device 20 according to Embodiment 2, it is so configured for the printed matter 1 to be determined when there is recognized a difference of a predetermined value or more between the luminance data of the glossy area 302 and the glossiness of the matte area 303, that it is an original print printed by a predetermined printing apparatus that forms the glossy area 302 and the matte area 303 on a printed surface, and to be determined when there is no significant difference, that it is a copied printed matter printed by a printing apparatus other than the predetermined one. Thus, like Embodiment 1, it is possible by an easy way to identify whether the printed matter 1 is an original print or a copied printed matter.

Embodiment 3

In Embodiment 1, the two kinds of surface-finishes for the glossy area 302 and the matte area 303 are applied on the surface of the printed matter 1, so that whether the printed matter 1 is an original print printed by a predetermined printing apparatus or a copied printed matter printed by a printing apparatus other than the predetermined one, is identified from the difference between the luminance data of the reflected images 4a, 4b on the surface of the printed matter 1.

In Embodiment 3, the printed matter 1 printed by a printing apparatus having a function of providing the two kinds of surface-finishes for the glossy area 302 and the matte area 303 is identified, and further, the printing apparatus used for printing that printed matter 1 is determined.

A printed matter identifying apparatus according to Embodiment 3 will be described using FIG. 15 and FIG. 16.

With respect to the configuration of the printed matter identifying device 10 according to Embodiment 3, it is similar to that illustrated in FIG. 1 of Embodiment 1, so that duplicated description will be omitted here.

FIG. 15 is a diagram showing an example of transferred positions of the glossy area(s) 302 and the matte area(s) 303 on the printed matter 1, according to Embodiment 3 of the invention.

FIG. 16 is a table showing a correspondence between the transferred positions of the glossy area(s) 302 and the matte area(s) 303 on the printed matter 1 and a kind of the printer, according to Embodiment 3 of the invention. This correspondence table is stored in an image determination unit 40.

In FIG. 15, represented by A, B and C are each a position where the reflected image 4a or 4b of the light source 3 is measured.

As shown in FIG. 11, by using a line light source, reflected images in three places can be captured by one capturing operation. In Embodiment 3, an OP transferred onto the measuring positions A, B, C is made different in surface finish for every printer 101 being the printing apparatus. FIG. 16 is the correspondence table of a surface-finish state with respect to a kind of printer and to each measuring position A, B, C.

First, description will be made using the case, as an example, where the determination is performed for the printed matter 1 with the measuring position A=a glossy area 302, B=a glossy area 302, and C=a matte area 303, as shown at FIG. 15(a). Similarly to Embodiment 1, reflected images 4a, 4b of the light source 3 in the measuring positions A, B, C are acquired and image analysis is performed thereon to thereby calculate luminance distribution graphs. When the widths from the rising edges to the trailing edges in the respective luminance distribution graphs are defined as DA, DB and DC, their magnitude relationship is given as DC>DA≈DB.

Here, because there is recognized a difference between DC and DA (DB), firstly, the printed matter 1 is determined as a printed matter 1 printed by a predetermined printing apparatus. Secondly, the surface states of the measuring positions A, B, C are determined as A=a glossy area, B=a glossy area, and C=a matte area. This reveals that the printing apparatus that printed the printed matter 1 is a printer A, from the correspondence table shown in FIG. 16 stored in the image determination unit 40.

Next, description will be made using the case, as an example, where the determination is performed for the printed matter 1 with the measuring position A=a matte area 303, B=a glossy area 302, and C=a matte area 303, as shown at FIG. 15(b). In this case, a magnitude relationship of the widths DA, DB, DC from the rising edges to the trailing edges in the luminance distribution graphs, is given as DA≈DC>DB. Here, because there is recognized a difference between DC (DA) and DB, firstly, the printed matter 1 is determined as a printed matter 1 printed by a predetermined printing apparatus. Secondly, the surface states of the measuring positions A, B, C are determined as A=a matte area, B=a glossy area, and C=a matte area. This reveals that the printing apparatus that printed the printed matter 1 is a printer E, from the correspondence table shown in FIG. 16 stored in the image determination unit 40.

As a result of the luminance distribution comparison for the measuring positions A, B, C, if there is recognized no difference, the printed matter 1 is determined to be a copied printed matter printed by other than the predetermined printing apparatus. Further, even if a difference is recognized, when the surface states of the measuring positions A, B, C obtained through measuring are unmatched to the correspondence table shown in FIG. 16 (for example, when determined as A=a matte area, B=a matte area, and C=a glossy area), the printed matter 1 is also determined to be a copied printed matter printed by a printing apparatus other than the predetermined one.

As described above, the printed matter identifying device 10 according to Embodiment 3 can identify a kind of the printer used for printing the printed matter 1 from the measured results in the surface-state measuring places provided in plural number on the surface of the printed matter 1.

Note that in Embodiment 1, a glossy face and a matte face are both formed on a single printed surface by controlling the OP-transfer energy of the thermal-transfer printer; however, it is also possible to both form the glossy face and the matte face on a single printed surface using a method different to that by controlling the OP-transfer energy.

Figure 17:
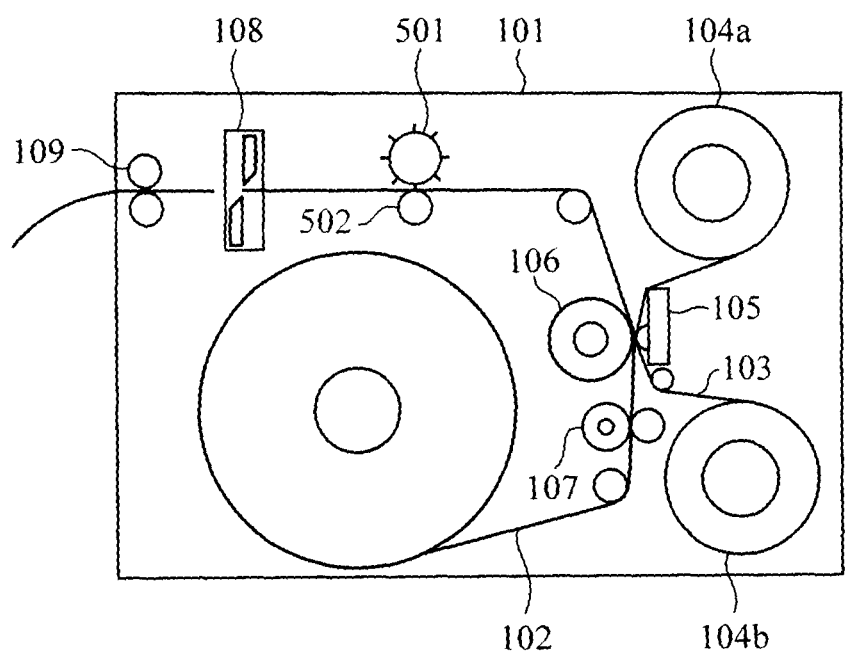
FIG. 17 is a configuration diagram showing a configuration of a printing apparatus that forms both a glossy face and a matte face on a single printed surface using a method different to that by controlling OP-transfer energy.

In the followings, using FIG. 17, description is made about a printing apparatus that forms both a glossy face and a matte face on a single printed sheet using a method different to that by controlling the OP-transfer energy.

FIG. 17 is a configuration diagram showing a configuration of the printing apparatus that forms both a glossy face and a matte face on a single printed surface using a method different to that by controlling OP-transfer energy. In FIG. 17, the same reference numerals are given for the components similar to those shown in FIG. 2 of Embodiment 1, so that their description is omitted here.

In FIG. 17, the printer 101 includes an emboss roller 501 and a counter roller 502.

The emboss roller 501 forms an unevenness on the surface of the printed matter 1, and fine projection portions are partially provided in width direction on the surface of the emboss roller 501. Further, the emboss roller 501 is configured to be contactable and releasable with respect to the counter roller 502 by use of an unshown actuation device, and in initial state, it is kept at a position away from the counter roller 502.

In the printer 101 shown in FIG. 17, after completion of printing operations of Y-color, M-color and C-color, an OP is transferred onto the whole of the printed surface of the recording paper 102 using uniform transferring energy, so that a glossy surface finish is provided on the whole of the printed surface. After completion of the OP-transferring, the recording paper 102 is fed to the emboss roller 501. Here, using the unshown actuation device, the emboss roller 501 is made contact with the counter roller 502 to thereby form an unevenness on the surface of the recording paper 102, and at the time the recording paper 102 is fed by a predetermined distance, the emboss roller 501 is released from the counter roller 502. Subsequent cutting operation and discharging operation of the recording paper 102 are the same as those in Embodiment 1.

As described above, because of the provision of the emboss roller 501 in the printer 101, an unevenness can be partially formed on the glossy face of the printed surface. Here, description has been made about the case where the unevenness is formed by the emboss roller 501 on the surface of a printed matter printed by the heat-transfer printer; however, according to the herein-described method for forming an unevenness on the printed surface, even for a printed matter printed by an ink-jet system or an electrophotographic system, it is possible to form the unevenness on the surface of the printed matter.

Embodiment 4

In the above Embodiment, whether the printed matter 1 is an original print printed by a predetermined printing apparatus or a copied printed matter printed by a printing apparatus other than the predetermined one, is identified by the luminance data of the glossy area 302 and the matte area 303 formed in the surface of the printed matter; however, with respect to the printer that uses a grip roller system for feeding the recording paper 102, it is allowable to determine the printed matter 1 to be a copied printed matter or not depending on whether a matte area 303 is not or is formed in the surface of the printed matter 1.

FIG. 18 is diagrams illustrating a configuration of a grip roller in the printer that uses a grip-roller system for feeding the recording paper 102 and a state of the back surface of the printed matter.

FIG. 18(*a*) is the diagram showing the configuration of the grip roller 107 in width direction, in which indicated at 107*a* are each a grip portion on which fine projection portions are provided. FIG. 18(*b*) is the diagram illustrating a state of the back surface of the printed matter 1 fed by the grip roller 107.

On the back surface of the printed matter 1, there are formed grip marks 601 having been developed when the grip portions 107*a* bit the back surface of the printed matter 1, and the portions of the grip marks 601 are placed in uneven state due to projections of the grip portions 107*a*. At this time, the surface state of a back surface 602 of the printed matter 1 where the grip mark 601 is not formed is different to the surface state of a portion where the grip mark 601 is formed.

FIG. 19 is a diagram illustrating an operation of acquiring image data of the printed-matter back-surface state by the printed matter identifying device 10 according to Embodiment 4 of the invention. Note that in Embodiment 4, since an internal configuration of the printed matter identifying device 10 is similar to the configuration of Embodiment 1, its illustration and description is omitted here.

In FIG. 19, the digital camera unit 2 captures the back surface 602 of the printed matter 1 printed by the printer 101 that uses a grip roller system. The image reading unit 12 acquires the image data captured by the digital camera unit 2 and transmits it to the image processing unit 13.

The image processing unit 13 performs image-processing of the image data of the back surface 602 of the printed matter 1 received from the image reading unit 12 and transmits the resultant to the image determination unit 14.

The image determination unit 14 can find that the printed matter 1 is that printed by the printer 101 with the grip roller system, when determined from the acquired image data of the back surface 602 of the printed matter 1 that the surface state of the back surface 602 (the surface state of an area having been not in contact with the grip roller) is different to the surface state of the grip mark 601 (an area having been in contact with the grip roller).

Usually, in an ink-jet printer and an electrophotographic printer, no grip roller system is used, so that the grip mark 601 is not formed on the back surface 602 of the printed matter. By detecting a difference between the portion on which the grip mark 601 is formed and the portion of the back surface 602 on which the grip mark 601 is not formed, it is possible to determine whether or not the printed matter is that printed by a printer that uses a grip roller system. Further, by changing the shape or the length in width direction of the grip portion 107*a* for each kind of printer, the position or the uneven state of the grip mark 601 can be changed, so that a kind of printer can also be identified by detecting that change.

As described above, by the printed matter identifying device 10 according to Embodiment 4, with respect to the printer that uses a grip roller system for feeding the recording paper, whether or not the printed matter 1 is that printed by the predetermined printer can be determined through detection of the grip mark 601 formed on the back surface 602 of the recording paper 102. Further, for determining whether or not the printed matter 1 is that printed by the predetermined printer, it is unnecessary to form a matte area in the surface of the printed matter 1, so that it becomes possible to make identification for the printed matter 1 having a uniform surface property over all areas of the surface.

It should be noted that unlimited combination of the respective embodiments, modification of any configuration element in the embodiments and omission of any configuration element in the embodiments may be made in the present invention without departing from the scope of the invention.

Industrial Applicability

The printed matter identifying device and the printed matter identifying system according to the invention include the image determination unit that determines, using a differential value in image information of the reflected images resulting from the image-processing by the image processing unit, whether or not the printed matter is a printed matter printed by a predetermined printing apparatus, so that, without requiring the special paper or device and by an easy way, it is possible to identify whether the printed matter is an original print or a copied printed matter. Thus, they are suited to be used as a printed matter identifying device and a printed matter identifying system that are related to authenticity determination of a printed matter, in particular, for identifying whether or not the printed matter is that printed by the predetermined printing apparatus.

Description Of Reference Numerals And Signs

1: printed matter, 2: digital camera unit, 3: light source, 4: reflected image, 4*a*: reflected image in a glossy area, 4*b*: reflected image in a matte area, 5: gloss meter, 10, 20: printed matter identifying device, 11, 21: control unit, 12: image reading unit, 13: image processing unit, 14: image determination unit, 22: glossiness measuring unit, 23: glossiness determination unit, 101: printer, 102: recording paper, 103: ink sheet, 104*a*: ink-sheet supplying reel, 104*b*: ink-sheet winding reel, 105: thermal head, 106: platen roller, 107: grip roller, 107*a*: grip portion, 108: recording-paper cutting mechanism, 109: paper discharging roller, 110: OP-pattern storing unit, 120: memory, 130: data processing unit, 140: control unit, 150: thermal-head driving unit, 160: paper-feeding mechanism driving unit, 170: recording-paper cutting mechanism driving unit, 180: ink-sheet feed driving unit, 201: Y-color head position marker, 202: another ink-color head position marker, 301: OP pattern, 302: glossy area, 303: matte area, 303*a*: high density pattern, 303*b*: low density pattern, 401: luminance distribution graph of reflected image in a glossy area, 402: luminance distribution graph of reflected image in a matte area, 501: emboss roller, 502: counter roller, 601: grip mark, 602: back surface.

The invention claimed is:

1. A printed matter identifying device that identifies a printed matter printed by a predetermined printing apparatus and having on its surface at least two or more areas that are different in surface property from each other, said printed matter identifying device comprising:
    an image reader that captures reflected images displayed by a light source respectively on the areas of the surface of the printed matter by a camera to acquire respective image information of the reflected images;
    an image processor that performs image-processing of the image information of the reflected images acquired by the image reader; and
    an image determinator that uses a differential value of image information based on luminance values between said at least two or more areas that are different from each other in surface property and included in a same printed matter in the reflected images obtained by the image-processing by the image processor, to determine whether or not the printed matter is a printed matter printed by the predetermined printing apparatus.

2. The printed matter identifying device of claim 1, wherein the image determinator detects the differential value from maximum luminance values of said two or more areas different in surface property.

3. The printed matter identifying device of claim 1, wherein the image determinator detects the differential value from luminance distribution states of said two or more areas different in surface property.

4. A printed matter identifying device that identifies a printed matter printed by one of predetermined printing apparatuses and having on its surface at least two or more areas that are different in surface property from each other, said printed matter identifying device comprising:
    an image reader that captures reflected images displayed by a light source respectively on the areas of the surface of the printed matter by a camera to acquire respective image information of the reflected images;
    an image processor that performs image-processing of the image information in the reflected images acquired by the image reader;
    an image determinator that uses a differential value between the image information based on luminance values between areas having different surface properties in the reflected images obtained by the image-processing by the image processor, to determine whether or not the printed matter is a printed matter printed by said one of the predetermined printing apparatuses; and
    a storage that assigns a position on the surface of the printed matter peculiarly for each kind of the predetermined printing apparatuses, and stores information in which said position peculiarly assigned and said each kind of the predetermined printing apparatuses are associated with each other;
    wherein the image determinator, in addition to determining whether or not the printed matter is a printed matter printed by said one of the predetermined printing apparatuses, determines from the information stored in the storage, the kind of said one of the predetermined printing apparatuses.

5. A printed matter identifying system which comprises the printed matter identifying device described in claim 1 and a predetermined printing apparatus,
    wherein the predetermined printing apparatus is a printing apparatus that forms on the surface of the printed matter, two different surface-finish areas of a glossy area and a matte area.

6. A printed matter identifying system which comprises the printed matter identifying device described in claim 4 and a predetermined printing apparatus,
    wherein the predetermined printing apparatuses are each a printing apparatus that forms on the surface of the printed matter, two different surface-finish areas of a glossy area and a matte area.

7. A printed matter identifying system which comprises the printed matter identifying device described in claim 1 and a predetermined printing apparatus,
    wherein the predetermined printing apparatus is a thermal-transfer printer.

8. A printed matter identifying system which comprises the printed matter identifying device described in claim 4 and a predetermined printing apparatus,
    wherein the predetermined printing apparatuses are each a thermal-transfer printer.

9. A printed matter identifying system which comprises the printed matter identifying device described in claim 1 and a predetermined printing apparatus,
    wherein the predetermined printing apparatus is a printing apparatus having a hologram printer.

10. A printed matter identifying system which comprises the printed matter identifying device described in claim 4 and a predetermined printing apparatus,
    wherein the predetermined printing apparatuses are each a printing apparatus having a hologram printer.

11. A printed matter identifying system which comprises the printed matter identifying device described in claim 1 and a predetermined printing apparatus,
    wherein the predetermined printing apparatus is a printing apparatus having a metallic printer.

12. A printed matter identifying system which comprises the printed matter identifying device described in claim 4 and a predetermined printing apparatus,
    wherein the predetermined printing apparatuses are each a printing apparatus having a metallic printer.

13. A printed matter identifying device that identifies a printed matter printed by a predetermined printing apparatus in which the printed matter is fed using a grip roller, said printed matter identifying device comprising:
    an image reader that acquires image information of a back surface of the printed matter captured by a camera;
    an image processor that performs image-processing of the image information of the back surface of the printed matter captured by the camera; and
    an image determinator that uses a differential value between portions of the image information in an area that is on the back surface of the printed matter and having been contacted with the grip roller and in an area that is on the back surface of the printed matter and not having been contacted with the grip roller, to determine whether or not the printed matter is a printed matter printed by the predetermined printing apparatus.

14. The printed matter identifying device of claim 3, wherein the luminance distribution states include:
    glossy luminance distribution in the glossy area having a width Da from a rising edge to a trailing edge of the glossy luminance distribution, and
    a matte luminance distribution in the matte area having a width Db from a rising edge to a trailing edge of the matte luminance distribution, wherein the image determinator determines the differential value based on a comparison of Db and Da.

* * * * *